US011713779B2

(12) United States Patent
Shih

(10) Patent No.: US 11,713,779 B2
(45) Date of Patent: Aug. 1, 2023

(54) FAST CHIP REMOVAL REAMING SCREW

(71) Applicant: BI-MIRTH CORP., Kaohsiung (TW)

(72) Inventor: Yi-Chieh Shih, Kaohsiung (TW)

(73) Assignee: BI-MIRTH CORP., Kaohsiung (TW)

(*) Notice: Subject to any disclaimer, the term of this patent is extended or adjusted under 35 U.S.C. 154(b) by 210 days.

(21) Appl. No.: 17/199,615

(22) Filed: Mar. 12, 2021

(65) Prior Publication Data

US 2021/0372455 A1 Dec. 2, 2021

(30) Foreign Application Priority Data

May 29, 2020 (TW) .................................. 109118095

(51) Int. Cl.
*F16B 35/04* (2006.01)
*F16B 25/00* (2006.01)

(52) U.S. Cl.
CPC ...... *F16B 25/0078* (2013.01); *F16B 25/0015* (2013.01); *F16B 25/0057* (2013.01)

(58) Field of Classification Search
CPC .............. F16B 25/0057; F16B 25/0015; F16B 25/0078
USPC ................................................ 411/411, 387.2
See application file for complete search history.

(56) References Cited

U.S. PATENT DOCUMENTS

| 4,637,767 A * | 1/1987 | Yaotani | F16B 25/0047 411/386 |
| 6,514,026 B1 * | 2/2003 | Gerhard | F16B 25/0047 411/311 |
| 6,739,815 B2 * | 5/2004 | Takasaki | F16B 25/0073 411/387.3 |
| 2005/0158149 A1 * | 7/2005 | Panasik | B21H 3/02 411/411 |
| 2007/0237606 A1 * | 10/2007 | Takasaki | F16B 25/10 411/387.2 |
| 2009/0169334 A1 * | 7/2009 | Su | F16B 25/10 411/413 |
| 2013/0011214 A1 * | 1/2013 | Lin | F16B 25/0057 411/387.4 |
| 2014/0294534 A1 * | 10/2014 | Park | F16B 25/0057 411/387.1 |
| 2015/0010374 A1 * | 1/2015 | Park | F16B 25/0063 411/387.1 |

(Continued)

FOREIGN PATENT DOCUMENTS

TW M491743 U 12/2014

*Primary Examiner* — Gary W Estremsky
(74) *Attorney, Agent, or Firm* — Muncy, Geissler, Olds & Lowe, P.C.

(57) ABSTRACT

The present invention provides a fast chip removal reaming screw, including a screw head, a rod body extending from the screw head and a first thread arranged on the rod body. The rod body includes a rod body portion connected to the screw head, an reaming portion, and a pointed cone portion. The reaming portion includes first reaming blocks, second reaming blocks and third reaming blocks which are disposed in a helically staggered manner, and chip removal paths formed between the first reaming blocks, the second reaming blocks and the third reaming blocks. A first width of the chip removal path located between the first reaming blocks and a second width of the chip removal path located between the second reaming blocks are different, so that wood chips can be fast removed to reduce a stress between the screw and a wood workpiece.

9 Claims, 6 Drawing Sheets

(56) References Cited

U.S. PATENT DOCUMENTS

2017/0241463 A1\* 8/2017 Shih .................... F16B 25/0084
2017/0343029 A1\* 11/2017 Hsu ..................... F16B 25/0052
2019/0301516 A1\* 10/2019 Lucas ................. F16B 25/0057
2021/0102571 A1\* 4/2021 Hu ...................... F16B 25/0015

\* cited by examiner

FAST CHIP REMOVAL REAMING SCREW

FIELD OF THE INVENTION

The present invention relates to a reaming screw, in particular to a fast chip removal reaming screw capable of reducing a lock screwing torch and preventing cracking a locked material, and capable of fast removing wood chips.

BACKGROUND OF THE INVENTION

When a wood screw is locked into a wood with higher hardness, it is more laborious to screw in the wood since the wood comprises higher density and stronger resistance, and wood chips produced in a screwing process cannot be effectively removed but remain in the wood, and the wood chips are pressed by a screw-in pressure of the wood screw to crack the wood easily.

With reference to a wood screw disclosed in Taiwan Utility Model No. M491743, the wood screw includes a screw head for connecting with a locking tool, a rod body extending from the screw head to include a parallel rod body portion, a pointed cone part formed at an end of the parallel rod body and gradually tapered, and a tip end formed at an end of the pointed cone part. At least one first thread formed on the parallel rod body portion, and a pattern formed at the end of the parallel rod body portion adjacent to the pointed cone portion or formed on the pointed cone portion without extending to the tip end. A purpose thereof is to lock the wood screw into the wood without pre-drilling, and prevent the wood from cracking and breakage of the wood screw. Also, a screwing torque is reduced during locking so that an operator can lock the wood screw into the wood with higher hardness effortlessly.

However, a conventional wood screw includes a pattern composed of irregular protrusions, resulting in an uneven engage force between a pattern part of the wood screw and a workpiece in a tapping and locking process. After the wood screw is tapped, problems such as unstable joint and shaking will occur. The pattern is formed by a plurality of convex ribs or rhombic mesh-grid, without a wood chip removal structure, so that the wood chips produced in the tapping and locking process cannot be removed, but be accumulated between the pattern part and the workpiece, causing a pressure between the wood screw and the workpiece to be increased so that workpiece cracking and so on occurred. In addition, since a thread of the wood screw in each section is disposed at an interval in manufacturing process, and the manufacturing process is completed for multiple times, causing higher cost, waste of time and other problems. In view of the above-mentioned problems, a fast chip removal reaming screw is provided to overcome the conventional defects.

SUMMARY OF THE INVENTION

The objective of the present invention is to solve the problem that a conventional wood screw cannot provide effective fast wood chip removal during wood tapping and locking to disperse stress between the wood screw and the workpiece.

In order to achieve the above objective, the present invention provide a fast chip removal reaming screw, including a screw head, a rod body and at least one first thread. The screw head includes a top portion and a neck portion which extends from the top portion and gradually tapers towards a direction opposite to the top portion. The rod body extends out of the neck portion of the screw head; the rod body includes a rod body portion connected to the neck portion, a reaming portion connected to the rod body portion, and a pointed cone portion connected to an end of the reaming portion opposite to the rod body portion; the reaming portion includes a plurality of first reaming blocks, a plurality of second reaming blocks and a plurality of third reaming blocks which are disposed in a helically staggered manner, and a plurality of chip removal paths formed between the first reaming blocks, the second reaming blocks and the third reaming blocks. The plurality of chip removal paths further include a first chip removal path located between any two first reaming blocks and a second chip removal path located between any two second reaming blocks. The first thread is annularly arranged on a surface of the rod body away from the pointed cone portion via the reaming portion to the rod body portion. The first chip removal path has a first width on the surface of the rod body, and the second chip removal path has a second width on the surface of the rod body. The first width and the second width are different.

Further, the first width of the first chip removal path is less than the second width of the second chip removal path, and the first width is greater than zero.

Further, the first reaming blocks are annularly arranged between the rod body portion and the pointed cone portion.

Further, the third reaming blocks are annularly arranged at a joint between the reaming portion and the rod body portion, and a joint between the reaming portion and the pointed cone portion.

Further, the first thread is protruded from the rod body with a first tooth height, and the first reaming blocks are protruded from the rod body with a first reaming height. The first reaming height is less than or equal to half of the first tooth height, and the first reaming height is greater than zero.

Further, the first thread is protruded from the rod body with a first tooth height, and the second reaming blocks are protruded from the rod body with a second reaming height. The second reaming height is less than or equal to one-third of the first tooth height, and the second reaming height is greater than zero.

Further, the rod body portion includes a taper thread adjacent to a side of the first thread adjacent to the screw head.

Further, the first reaming blocks and the second reaming blocks are pyramidal bodies.

Further, each of the reaming blocks includes a cutting end and a plurality of slope sections inclined from the cutting end to the surface of the rod body.

Therefore, compared with the prior art, the present invention has the following beneficial effects:

1. In the present invention, the rod body is provided with the reaming portion, and the reaming portion is provided with the plurality of first reaming blocks, the plurality of second reaming blocks and the plurality of third reaming blocks which are helically staggered. The plurality of chip removal paths are formed between the first reaming blocks, the second reaming blocks and the third reaming blocks, so that holes having diameters greater than a rod diameter are reamed by the first reaming blocks, the second reaming blocks and the third reaming blocks which have different sizes. As such, the fast chip removal reaming screw can be subsequently tapped in the holes pre-formed in the reaming portion in less effort. Moreover, cut-down wood chips produced by the reaming portion can be fast removed along the plurality of chip removal paths having different widths between the first reaming blocks, the second reaming blocks and the third reaming blocks. The stress between the fast chip removal reaming screw and the workpiece can be evenly dispersed to achieve tapping and locking in a power-saving state and fast chip removal.

2. The first thread of the present invention is connected to the reaming portion. The reaming portion taps, locks and embeds the workpiece via the first thread during tapping of the holes to form stable positioning, so that the workpiece is tapped and locked in a stable state to prevent cracking of the workpiece due to shake of the screw.

DETAILED DESCRIPTION OF THE PREFERRED EMBODIMENTS

Figure 1:
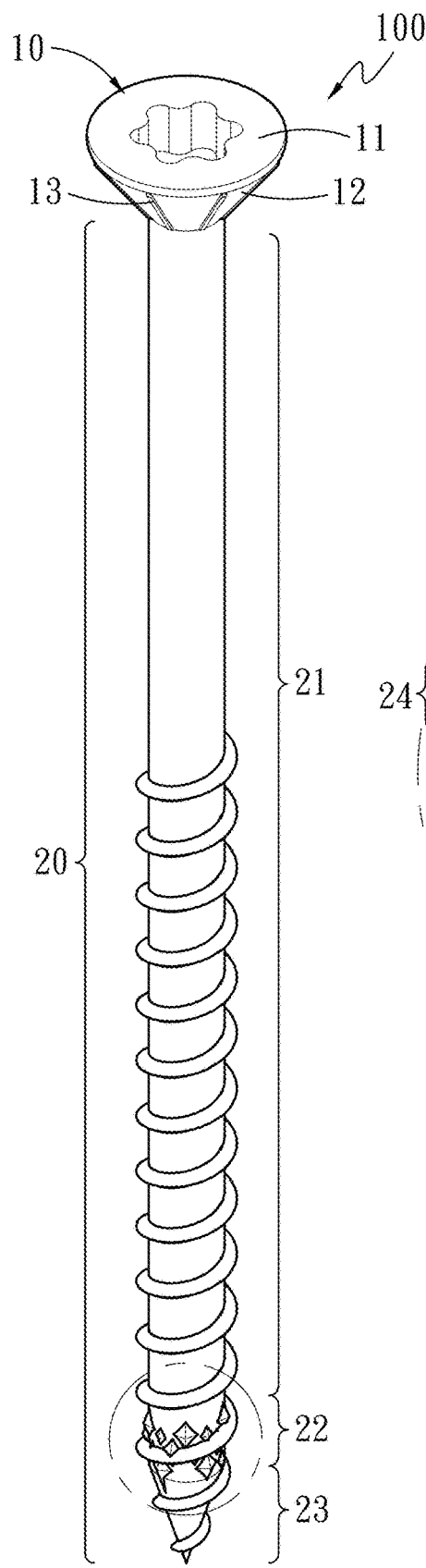
FIG. 1 is a stereogram of a fast chip removal reaming screw of the present invention.

For the technology of the present invention, referring to FIGS. 1, 2, 3, 4, 5, 6 and FIG. 7, the present invention provides a fast chip removal reaming screw 100 including a screw head 10, a rod body 20 connected to the screw head 10, and a first thread 30 arranged on a surface of the rod body 20. The fast chip removal reaming screw 100 of the present invention is used for fixing or connecting a wood workpiece W, such as a wooden floor and wooden furniture.

More specifically, referring to FIGS. 1, 2, 3 and FIG. 4, the screw head 10 includes a top portion 11, and a neck portion 12 which extends from the top portion 11 and gradually tapered towards a direction opposite to the top portion 11. The neck portion 12 is provided with a plurality of convex ribs 13 to reinforce the embedded firmness of the wood workpiece W after the fast chip removal reaming screw 100 is screwed into the wood workpiece W.

Figure 2:
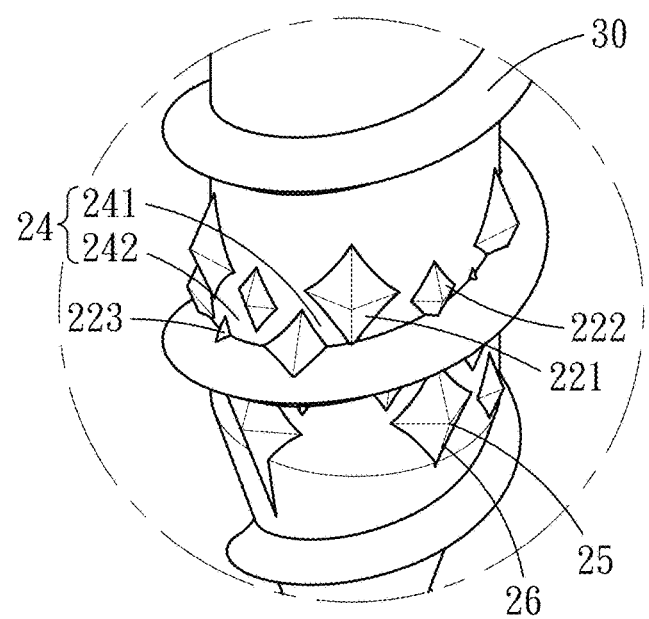
FIG. 2 is a partially enlarged diagram of a circled position of FIG. 1.
Figures 3, 4:
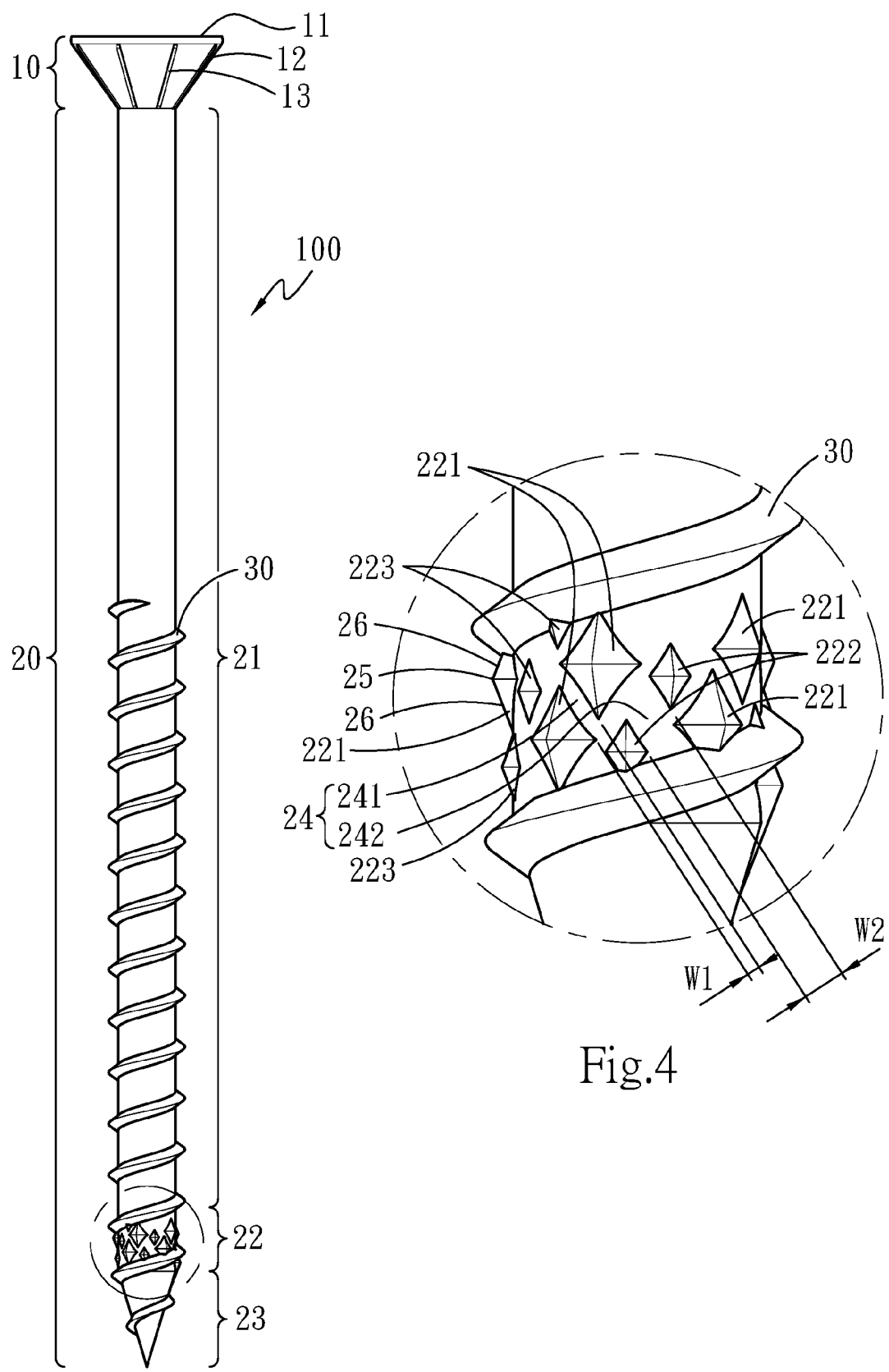
FIG. 3 is a stereogram of a fast reaming screw of the present invention from another visual angle.
FIG. 4 is a partially enlarged diagram of a circled position of FIG. 3.

The rod body 20 extends out of the neck portion 12 of the screw head 10. The rod body 20 includes a rod body portion 21 connected to the neck portion 12, an reaming portion 22 connected to the rod body portion 21 and a pointed cone portion 23 connected to an end of the reaming portion 22 opposite to the rod body portion 21. Referring to FIG. 2 and FIG. 4, the reaming portion 22 includes a plurality of first reaming blocks 221, a plurality of second reaming blocks 222 and a plurality of third reaming blocks 223 which are helically staggered, and a plurality of chip removal paths 24 formed between the first reaming blocks 221, the second reaming blocks 222 and the third reaming blocks 223. Furthermore, the first reaming blocks 221 are annularly arranged between the rod body portion 21 and the pointed cone portion 23, the third reaming blocks 223 are annularly arranged at a joint of the reaming portion 22 and the rod body portion 21 as well as a joint of the reaming portion 22 and the pointed cone portion 23, and each of the first reaming blocks 221, the second reaming blocks 222 and the third reaming blocks 223 has different size. Each of the first reaming blocks 221, the second reaming blocks 222 and the third reaming blocks 223 includes a cutting end 25 and a plurality of slope sections 26 inclined from the cutting end 25 towards the surface of the rod body 20. Each of the first reaming blocks 221, the second reaming blocks 222 and the third reaming blocks 223 includes a cutting end 25 which is in point contact with the wood workpiece W, so that wood fibers are facilitated to be cut off during cutting, and cut-down wood chips from the wood workpiece W can enter the plurality of chip removal paths 24 along the plurality of slope sections 26 to be removed. The plurality of chip removal paths 24 further include a first chip removal path 241 located between any two of the first reaming blocks 221 and a second chip removal path 242 located between any two of the second reaming blocks 222, the second reaming block 222 and the third reaming block 223 are not provided on the first chip removal path 241. The first reaming block 221 and the third reaming block 223 are not provided on the second chip removal path 242 either. That is, the first reaming blocks 221, the second reaming blocks 222 and the third reaming blocks 223 are not provided on the plurality of chip removal paths 24. In addition, the first reaming blocks 221, the second reaming blocks 222 and the third reaming blocks 223 may be prisms, such as a pyramid and a square pyramid. The present embodiment is mainly based on the square pyramid, but is not limited to this.

Figure 5:
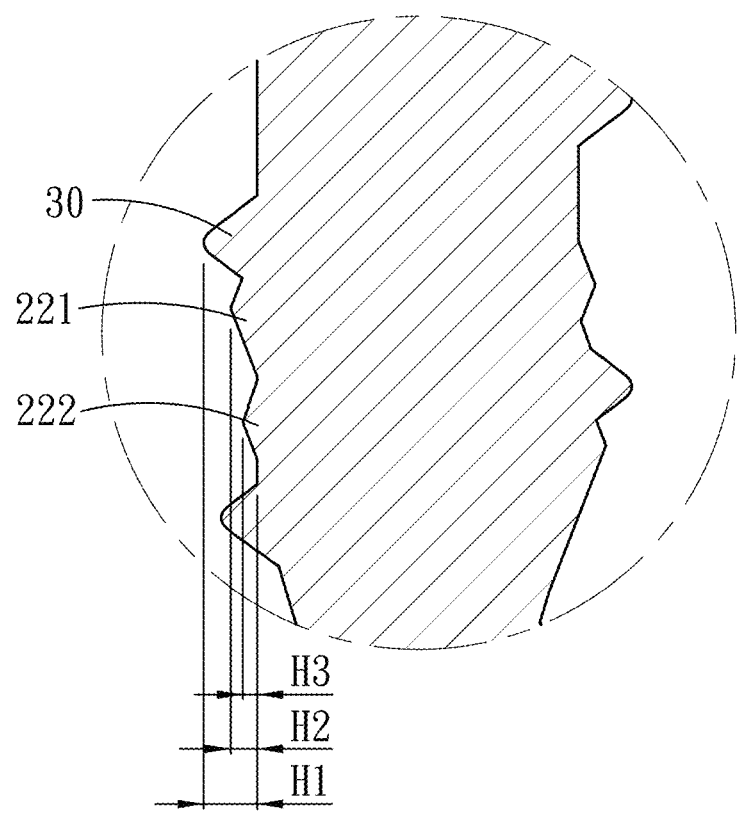
FIG. 5 is a cross sectional diagram of FIG. 4.

Referring to FIG. 3 and FIG. 4, the first thread 30 is annularly arranged on the surface of the rod body 20 from the pointed cone portion 23 via the reaming portion 22 to the rod body portion 21. Referring to FIG. 5, the first thread 30 is protruded from the rod body 20 with a first tooth height H1, and the first reaming blocks 221 is protruded from the surface of the rod body 20 with a first reaming height H2. The first reaming height H2 is less than or equal to half of the first tooth height H1, and the first reaming height H2 is greater than zero. the second reaming blocks 222 is protruded from the surface of the rod body 20 with a second reaming height H3, wherein the second reaming height H3 is less than or equal to one-third of the first tooth height H1, and the second reaming height H3 is greater than zero. The rod body 20 of the present embodiment is primarily provided with one first thread 30. The rod body 20 may also be provided with two or more first threads 30. It is not limited to this.

Referring to FIG. 4, the first chip removal path 241 includes a first width W1 on the surface of the rod body 20, and the second chip removal path 242 includes a second width W2 on the surface of the rod body 20. The first width W1 and the second width W2 are different. The first width W1 is an average width of the first chip removal path 241, and the width W2 is an average width of the second chip removal path 242. In this embodiment, the first width W1 of the first chip removal path 241 is less than the second width W2 of the second chip removal path 242, and the first width W1 is greater than zero.

Figure 6:
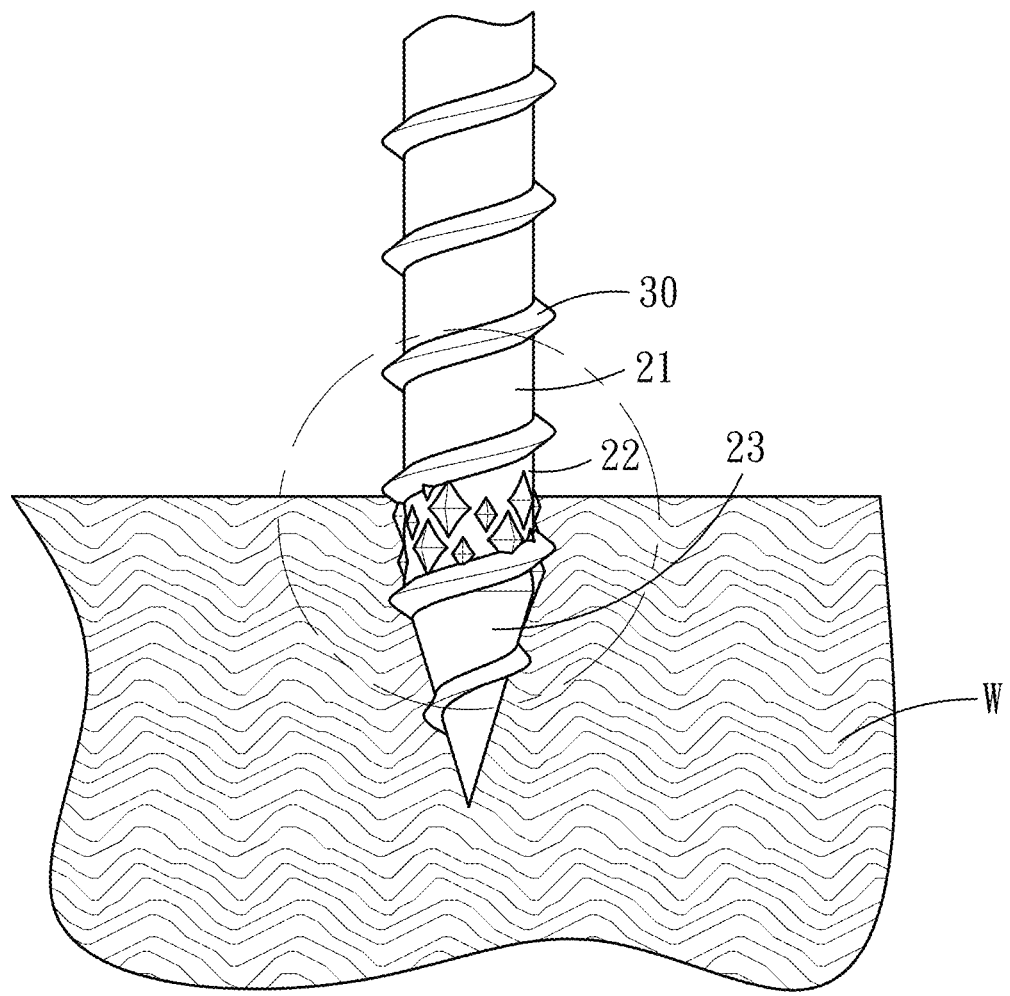
FIG. 6 is a schematic diagram of an action for tapping and locking a wood workpiece by a fast chip removal reaming screw of the present invention.
Figure 7:
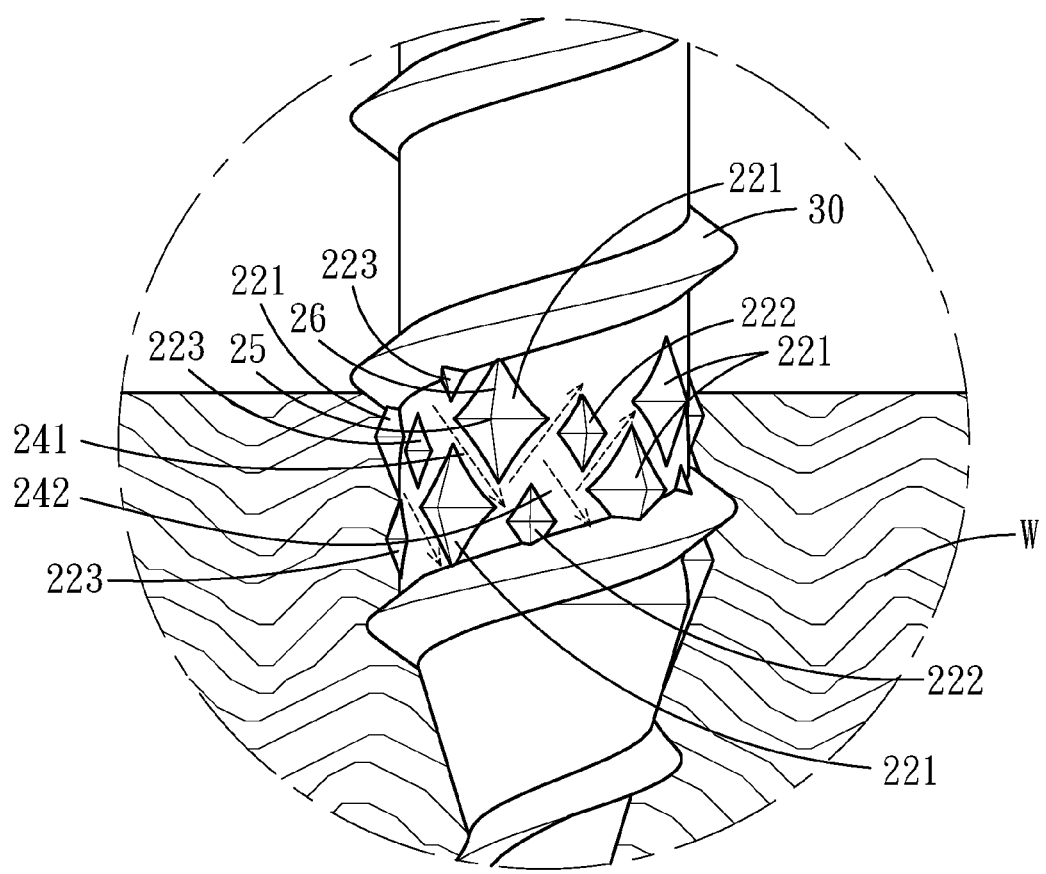
FIG. 7 is a schematic diagram of a partially enlarged action of an reaming portion of a fast chip removal reaming screw of the present invention.

Referring to FIG. 6 and FIG. 7, the fast chip removal reaming screw 100 is positioned on the wood workpiece W via the pointed cone portion 23 first. During reaming, a second reaming block 222 which is smaller is arranged between two first reaming blocks 221 to facilitate engaging with the wood workpiece W. The first width W1 of the first chip removal path 241 between two adjacent first reaming blocks 221 is less than the second width W2 between two adjacent second reaming blocks 222. By using the first reaming blocks 221 which are larger, a higher cutting force is provided for cutting the wood workpiece W fast, the cut-down wood chips from the wood workpiece W enter the second chip removal path 242 where a width is greater than the first width W1 of the first chip removal path 241, and the cut-down wood chips are continuously cut by the second reaming blocks 222 or the third reaming blocks 223. Thereby cracking of the wood workpiece W due to an extremely high cutting force is avoided, and prevent the cut-down wood chips from being stacked in the plurality of chip removal paths 24 so that the cut-down wood chips can be fast removed, and the wood workpiece W can be fast cut.

In addition, the first reaming blocks 221, the second reaming blocks 222 and the third reaming blocks 223 are disposed on the reaming portion 22 of the rod body 20 in a helically staggered manner, and the sizes of the first reaming blocks 221, the second reaming blocks 222 and the third reaming blocks 223 are different. The first chip removal path 241 of the plurality of chip removal path 24 is located between two adjacent first reaming blocks 221, the second chip removal path 242 of the plurality of chip removal path 24 is located between two adjacent second reaming blocks 222, and some of the plurality of chip removal paths 24 (not labeled in the figure) are not only arranged between the first reaming blocks 221 and the second reaming blocks 222, but also between the third reaming blocks 223 and the first reaming blocks 221 as well as the second reaming blocks 222. Therefore, the cut-down wood chips from the wood workpiece W are removed according to the plurality of chip removal paths 24 arranged in a staggered manner. Referring to FIG. 5, the first width W1 of the first chip removal path 241 and the second width W2 of the second chip removal path 242 are different, and the first width W1 is less than the second width W2 to facilitate evenly releasing a stress between the fast chip removal reaming screw 100 and the wood workpiece W (the dotted arrow in the figure is a wood chip removal direction), and the cut-down wood chips from the wood workpiece W are fast and smoothly removed during reaming, thereby reducing the stress between the fast chip removal reaming screw 100 and the wood workpiece W. In addition, the first width W1 of the first chip removal path 241 and the second width W2 of the second chip removal path 242 are less than a thread pitch of the first thread 30 to avoid too large pitch which results in problem of shake generated by a small contact area between the fast chip removal reaming screw 100 and the wood workpiece W. A planar angle of the first chip removal path 241 and the second chip removal path 242 is preferably in a range from 35 to 55 degrees. Wording of the planar angle of the present invention refers to an angle of the first chip removal path 241 and the second chip removal path 242 in a screw punch die during manufacturing process of the fast chip removal reaming screw 100. The cut-down wood chips, which are moved by the inclined cutting force formed by the first thread 30, are guided into the plurality of chip removal paths 24 more smoothly via the planar angel.

Figure 8:
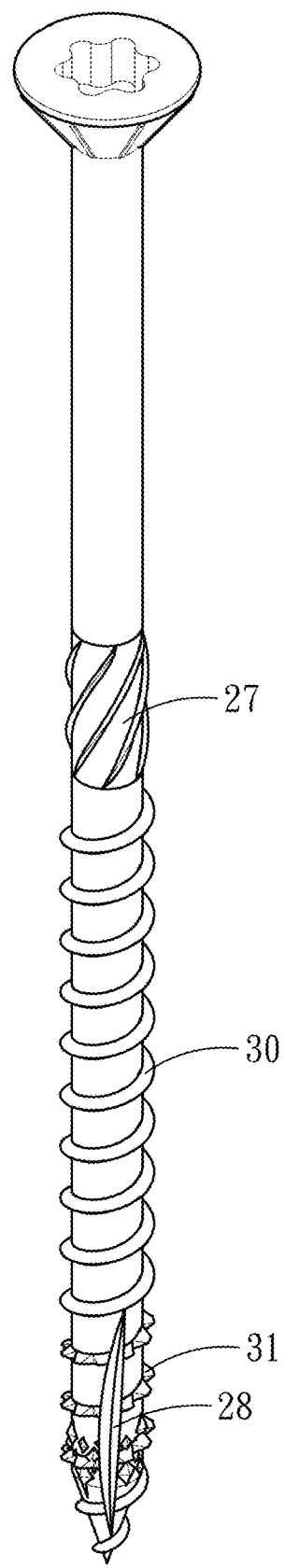
FIG. 8 is a stereogram of a fast chip removal reaming screw of another embodiment of the present invention.

Referring to FIG. 8 which is an another embodiment of the present invention, the rod body 20 includes a taper thread 27 which is adjacent to the first thread 30 and at a distance from the screw head 10. The taper thread 27 guides the cut-down wood chips to be removed from the wood workpiece W. The rod body 20 further includes a cutting tail slot 28 formed on the pointed cone portion 23. As such, the cut-down wood chips produced by tapping a screw hole can be fast removed along the cutting tail slot 28 to prevent the wood chips from remaining in the wood workpiece W, being crowded with each other to increase a friction force, and even cracking the wood workpiece W. In addition, a plurality of sawtooth cutting edges 31 are formed on a peripheral of the first thread 30 to effectively reduce the friction force for improvement of the locking efficiency during screwing.

In conclusion, the reaming portion 22 of the fast chip removal reaming screw 100 in the present invention is provided with the first reaming blocks 221, the second reaming blocks 222 and the third reaming blocks 223 in different sizes, and the plurality of chip removal paths 24 including different widths, so that the resistance of the fast chip removal reaming screw 100 is reduced to make tapping and locking with less effort when the fast chip removal reaming screw 100 is screwed into the wood workpiece W. Furthermore, the cut-down wood chips are fast removed from the wood workpiece W via the plurality of chip removal paths 24 which include different widths, and the stress between the fast chip removal reaming screw 100 and the wood workpiece W is evenly released. In addition, the fast chip removal reaming screw 100 can be located on the wood workpiece W with a stability via the first thread 30 on the reaming portion 22 and the sawtooth cutting edge 31 to improve an alignment accuracy during tapping and locking of the fast chip removal reaming screw 100.

What is claimed is:

1. A fast chip removal reaming screw, comprising:
 a screw head, comprising a top portion and a neck portion which extends from the top portion and gradually tapers towards a direction opposite to the top portion;
 a rod body, extending out of the neck portion of the screw head, wherein the rod body comprises a rod body portion connected to the neck portion, a reaming portion connected to the rod body portion, and a pointed cone portion connected to an end of the reaming portion opposite to the rod body portion, the reaming portion comprises a plurality of first reaming blocks helically aligned, a plurality of second reaming blocks helically aligned, a plurality of third reaming blocks helically aligned, and a plurality of chip removal paths, the plurality of first reaming blocks are alternately arranged with the plurality of second reaming blocks and the plurality of third reaming blocks, the plurality of chip removal paths are formed between the plurality of first reaming blocks, the plurality of second reaming blocks and the plurality of third reaming blocks, the chip removal paths further comprise a first chip removal path located between any adjacent two of the plurality of first reaming blocks and a second chip removal path located between any adjacent two of the plurality of second reaming blocks; and
 at least one first thread, annularly arranged on a peripheral surface of the rod body away from the pointed cone portion via the reaming portion to the rod body portion;
 wherein the first chip removal path has a first width on the peripheral surface of the rod body, the second chip removal path has a second width on the peripheral surface of the rod body, and the first width and the second width are different.

2. The fast chip removal reaming screw according to claim 1, wherein the first width of the first chip removal path is less than the second width of the second chip removal path, and the first width is greater than zero.

3. The fast chip removal reaming screw according to claim 1, wherein the plurality of first reaming blocks are annularly arranged between the rod body portion and the pointed cone portion.

4. The fast chip removal reaming screw according to claim 1, wherein the third reaming blocks are annularly arranged at a joint between the reaming portion and the rod body portion, and a joint between the reaming portion and the pointed cone portion.

5. The fast chip removal reaming screw according to claim 1, wherein the at least one first thread is protruded from the rod body with a first tooth height, the plurality of first reaming blocks are protruded from the rod body with a first reaming height, the first reaming height is less than or equal to half of the first tooth height, and the first reaming height is greater than zero.

6. The fast chip removal reaming screw according to claim 1, wherein the at least one first thread is protruded from the rod body with a first tooth height, and the plurality of second reaming blocks are protruded from the rod body with a second reaming height, the second reaming height is less than or equal to one-third of the first tooth height, and the second reaming height is greater than zero.

7. The fast chip removal reaming screw according to claim 1, wherein the rod body portion comprises a taper thread adjacent to a side of the at least one first thread adjacent to the screw head.

8. The fast chip removal reaming screw according to claim 1, wherein the plurality of first reaming blocks and the plurality of second reaming blocks are pyramidal bodies.

9. The fast chip removal reaming screw according to claim 1, wherein each of the plurality of first reaming blocks, the plurality of second reaming blocks and the plurality of third reaming blocks comprises a cutting end and a plurality of slope sections inclined from the cutting end to the peripheral surface of the rod body.

\* \* \* \* \*